United States Patent
Kawakita

(10) Patent No.: US 6,851,093 B2
(45) Date of Patent: Feb. 1, 2005

(54) IMAGE REPRODUCING APPARATUS

(75) Inventor: Mitsuru Kawakita, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 529 days.

(21) Appl. No.: 10/078,755

(22) Filed: Feb. 19, 2002

(65) Prior Publication Data
US 2002/0113828 A1 Aug. 22, 2002

(30) Foreign Application Priority Data
Feb. 19, 2001 (JP) .................................. P 2001-042115

(51) Int. Cl.[7] .............................................. G06F 15/00
(52) U.S. Cl. ...................................... 715/867; 715/764
(58) Field of Search ................................ 345/764, 765, 345/867

(56) References Cited

U.S. PATENT DOCUMENTS 6,687,382 B2 * 2/2004 Nagahara et al. ........... 382/100
6,710,790 B1 * 3/2004 Fagioli ....................... 345/802

FOREIGN PATENT DOCUMENTS

JP 2000-50207 2/2000 ............ H04N/5/92

* cited by examiner

Primary Examiner—Cao Kevin Nguyen
(74) Attorney, Agent, or Firm—Osha & May L.L.P.

(57) ABSTRACT

An image reproducing apparatus according to this invention is an apparatus which has a function of a screen saver and reproduce an image on the basis of the image data read out from a DVD 600, and includes: a first field memory 410 capable of storing image data corresponding to a plurality of images; a second field memory 420 which previously stores an image data of an opening image; an input unit 310 for selectively inputting a screen saver image from reproduced images; and a screen saver control unit 111 which stores the image data of the pertinent image in the first field memory 410 whenever the screen saver image is selectively inputted through the input unit.

3 Claims, 3 Drawing Sheets

IMAGE REPRODUCING APPARATUS

BACKGROUND OF THE INVENTION

This invention relates to an image reproducing apparatus for reproducing an image on the basis of the image data read out from a storage medium or image data contained in a video signal, and having a function of a screen saver.

Some image reproducing apparatus have a function of "screen saver" of reproducing a prepared screen saver image when the apparatus itself is substantially in a stopping state for a prescribed time with no operation by a user.

The screen saver inherently intends to prevent phosphor burn-in of a screen such as a CRT. However, in recent years, the screen saver image has been used as an object for enjoying. Examples of the screen saver image are images "enjoyable to see" such as a moving image of an animal, a popular character, a successive change of static images, etc. These images attach greater importance to the effect of interior or entertainment.

A prior art of the image reproducing apparatus having a screen saver function is disclosed in e.g. the Unexamined Japanese Patent Application Publication No.2000-50207. This device has a basic configuration of reading out at random image data stored in a DVD when the function of a screen saver is actuated and reproducing it as a screen saver image. As long as the DVD preferred by a user can be prepared, such a device can also reproduce the image contained therein as a screen saver image.

However, the above prior art has a defect that a user cannot freely select his favorite image from reproduced images as a screen saver image.

SUMMARY OF THE INVENTION

This invention has been accomplished in view of the above circumstance. An object of this invention is to provide an improved image reproducing apparatus which permits a user to select his favorite image from reproduced images as a screen saver image.

The image reproducing apparatus according to this invention is an apparatus which has a function of a screen saver and reproduces an image on the basis of the image data read out from a storage medium or the image data contained in a video signal, and includes: a first field memory capable of storing image data of reproduced images; an input unit for selectively inputting a screen saver image from reproduced images; and a screen saver control unit which stores the image data of the pertinent image in the first field memory when the screen saver image is selectively inputted through the input unit, and in starting the screen saver, the image data stored in the first field memory is read out to reproduce their images as screen saver images.

More preferably, the image reproducing apparatus according to this invention is provided with a second field memory which previously stores an image data of an opening image. In this case, the screen saver control unit may be configured so that where a single screen saver image is selectively inputted through the input unit, in starting the screen saver, the image data stored in the first field memory and stored in the second field memory are reproduced and images of both image data are alternately reproduced; and on the other hand, where two or more screen saver images are selectively inputted through the input unit, in starting the screen saver, the respective image data stored in the first field memory are successively read out and reproduced.

Another image reproducing apparatus according to this invention is an apparatus which has a function of a screen saver and reproduces an image on the basis of the image data read out from a storage medium or the image data contained in a video signal, and includes: a memory for storing the data of the track of a storage medium corresponding to a reproduced image, an input unit for selectively inputting a screen saver image from reproduced images, and a screen saver control unit which stores, in the memory, the data of the track of the storage medium corresponding to the image data of the pertinent image when the screen saver image is selectively selected through the input unit, reads out the data stored in the memory in starting the screen saver, and reproduces the image data stored in the track corresponding to the pertinent data from the storage medium.

DETAILED DESCRIPTION OF THE PREFERRED EMBODIMENTS

Figure 1:
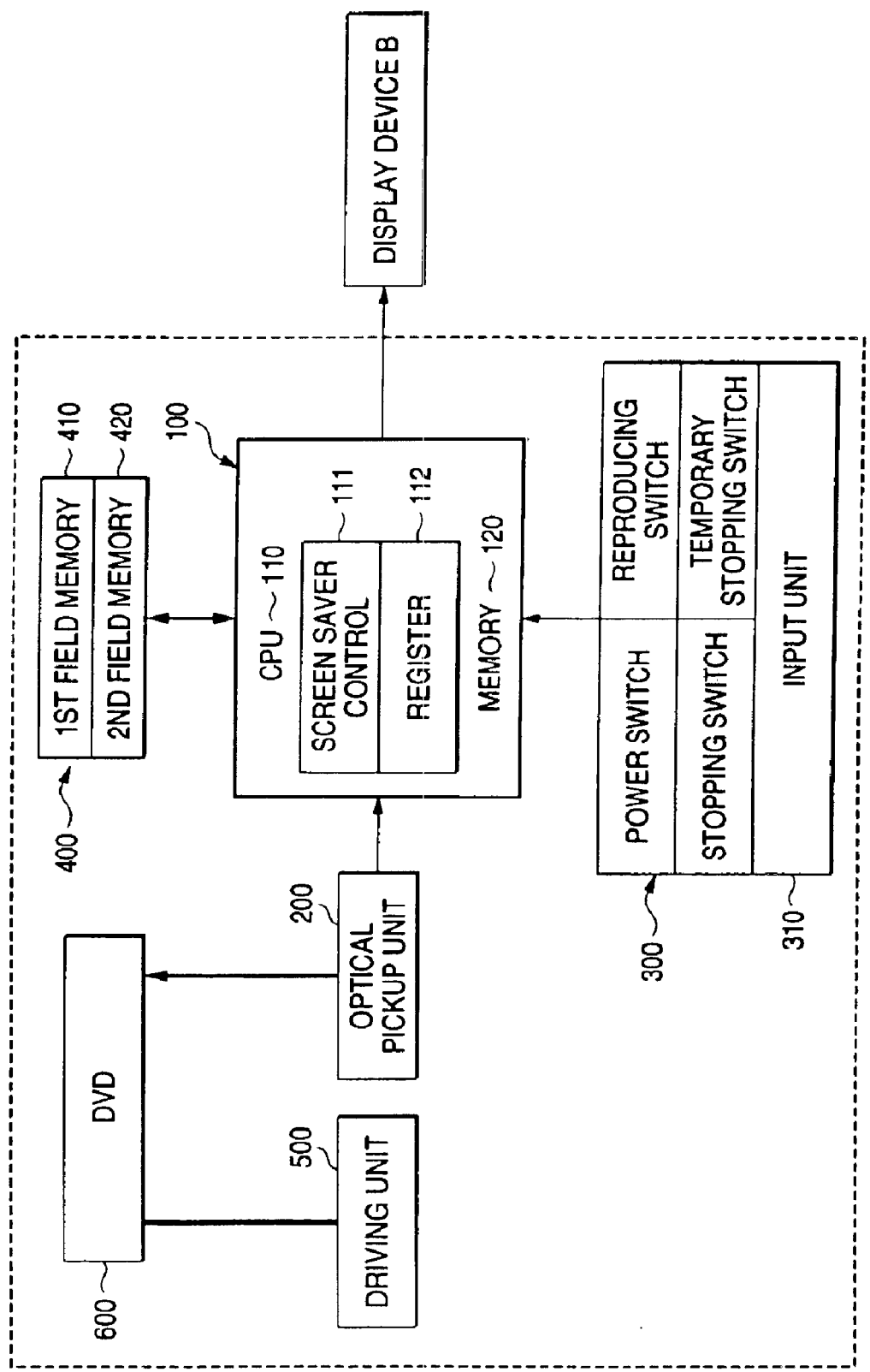
FIG. 1 is a block diagram of an image reproducing apparatus according to an embodiment of this invention.
Figure 2:
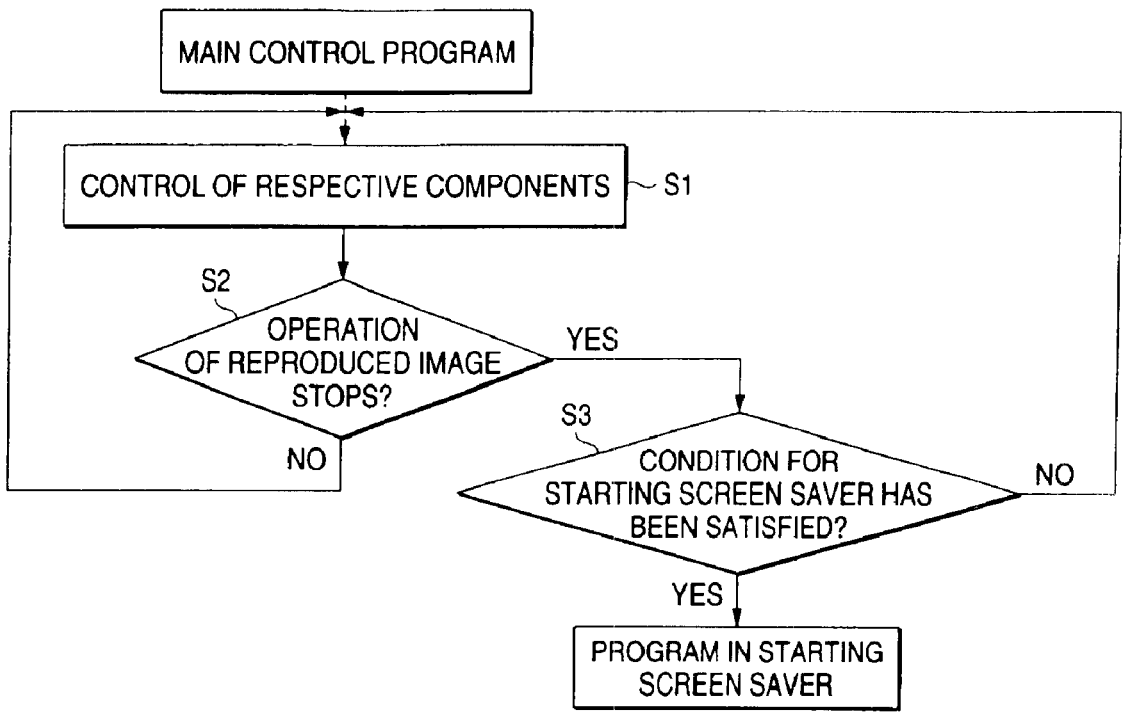
FIG. 2 is a flowchart of a main control program which is processed by a microcomputer in the image reproducing apparatus.
Figure 3:
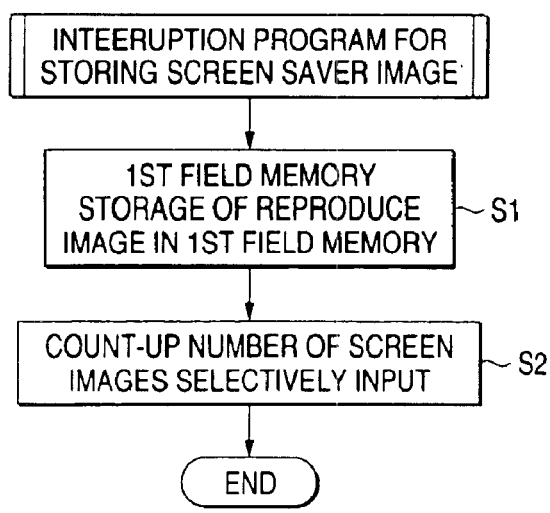
FIG. 3 is a flow chart of an interruption program for storing a screen saver image, which is processed by a microcomputer in the image reproducing apparatus.
Figure 4:
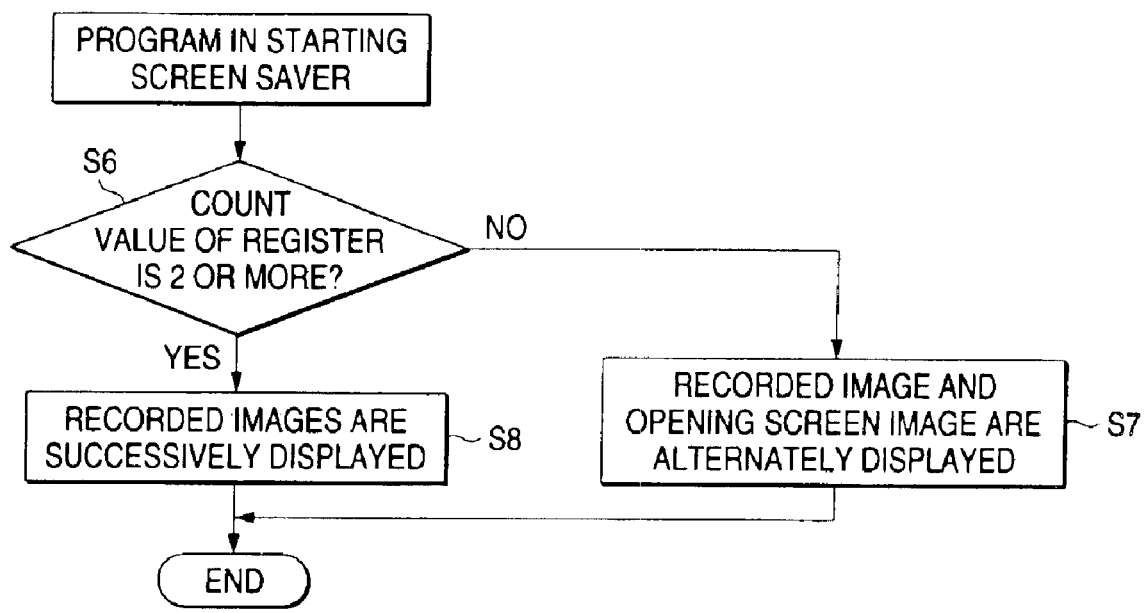
FIG. 4 is a flowchart of a program when starting a screen saver, which is processed by a microcomputer in the image reproducing apparatus.

Now referring to the drawings, an explanation will be given of embodiments of this invention. FIG. 1 is a block diagram of an image reproducing apparatus according to an embodiment of this invention. FIG. 2 is a flow chart of a main control program which is processed by a microcomputer in the image reproducing apparatus. FIG. 3 is a flowchart of an interruption program for storing a screen saver image, which is processed by a microcomputer in the image reproducing apparatus. FIG. 4 is a flowchart of a program when starting a screen saver, which is processed by a microcomputer in the image reproducing apparatus.

An image reproducing apparatus A identified here is an apparatus for reproducing an image on the basis of the image data read out from a DVD 600 serving as a storage medium, as shown in FIG. 1, and has a function of a screen saver. A display device B is externally connected to the image reproducing apparatus A.

In FIG. 1, reference numeral 100 denotes a microcomputer for controlling the respective components of the image reproducing apparatus. Reference numeral 200 denotes an optical pick-up unit for reading out the image data stored in the DVD 600. Reference numeral 300 denotes an operation switch including a power switch, a reproducing switch, a temporary stopping switch, a stopping switch, etc. Reference numeral 500 denotes a driving unit for driving the DVD 600. Incidentally, in FIG. 1, it should be noted that a control circuit for controlling the driving unit 500 and the optical pick-up unit 200 is not shown.

The microcomputer 100 incorporates a CPU 110, a memory 120, etc., and is connected to a memory 400 via a bus line. The microcomputer 100 is connected to the operation switch 300 at an input port. The microcomputer 100 is connected to the optical pick-up unit 200 via an image creating unit (not shown). Specifically, the image data read out from the DVD 600 by the optical pick-up unit 200 is subjected to a predetermined conversion by the image creating unit (not shown) and the microcomputer 100. The image data is thereafter supplied to the display device B.

The operation switch 300 is provided on the panel of the image reproducing apparatus A, or on the face of a remote control device for remote-controlling the apparatus. The condition for starting the screen saver can be set by the operation switch 300. The condition for starting the screen saver includes e.g. a period during which a user performs no operation and the apparatus itself is substantially in a stopping state, whether or not the user employs the screen saver function, etc.

The image reproducing apparatus A is particularly characterized in the following configuration. Specifically, the image reproducing apparatus A includes a first field memory 410 which can store the image data corresponding to a plurality of screen images, a second field memory which previously stores the image data of an opening screen image, an input unit 310 for selectively inputting a screen saver image from the reproduced images, and a screen saver control unit 111 which stores the image data of the pertinent screen in the first field memory whenever the screen saver image is selectively inputted through the input unit 310.

In addition, where a single screen saver image is selectively inputted through the input unit 310, in starting the screen saver, the image data stored in the first field memory 410 and stored in the second field memory 420 are reproduced and images of both image data are alternately reproduced. On the other hand, where two or more screen saver images are selectively inputted through the input unit 310, in starting the screen saver, the respective image data stored in the first field memory 410 are successively read out and reproduced. Each of the respective units which constitute the image reproducing apparatus A will be explained below.

Now, the first field memory 410 may be a RAM, whereas the second field memory 420 may be a ROM. Both memories are incorporated in the memory 400.

The input unit 310 may be a key switch, which is newly provided in the operation switch 300.

The screen saver control unit 111 is included in the microcomputer 100. Specifically, the memory 120 in the microcomputer 100 previously stores not only the main control program illustrated in FIG. 2, but also interruption program for storing a screen saver image, shown in FIG. 3 and a program when starting a screen saver, shown in FIG. 4. Since these programs are processed by the CPU 110, the screen saver control unit 111 exhibits its function. The number of screen images of the screen saver images which have been inputted through the input unit 310 is held in a register 112 within the CPU 110.

An explanation will be given of the contents of the programs illustrated in FIGS. 2 to 4 which will be processed by the microcomputer 100. For convenience of explanation, first, the interruption program for storing the screen saver image shown in FIG. 3 will be explained.

While the image stored in the DVD 600 is reproduced as a result that the reproducing switch incorporated in the operation switch is pressed, when the input unit 310 is pressed by the user, the interruption program for storing the screen saver image is processed.

First, the image data of the image reproduced at the timing when the input unit 310 has been pressed is stored in the first field memory 410 (S1). The data representative of that the a single screen saver image has been selectively inputted is stored and held in the register 112 (S2). Thus, the interruption program for storing the screen saver image is completed.

Thereafter, while the image stored in the DVD 600 is reproduced, when the input unit 310 is pressed again, the same processing as described above is performed so that the number of the screen images stored in the resister 112 is counted up. Namely, the data representative of that two screen saver images have been selectively inputted is stored and held. Also when the input unit 310 is pressed three or more times, the same processing as described will be performed.

Next, an explanation will be given of the basic contents of the main control program shown in FIG. 2. First, the respective components are controlled in the manner inputted through the operation switch 300 (S1). During the process of such control, it is decided whether or not the condition of starting a screen saver prescribed by a user has been satisfied (S2).

If it is decided that the condition of starting the screen saver has not been satisfied, the processing returns to step S1. On the other hand, if it is decided that the condition of starting the screen has been satisfied, the program for starting the screen saver as shown in FIG. 4 is processed. The contents of the program are as follows.

First, the data stored in the register 112 is read to decide whether or not two or more screen saver images have been selectively inputted (S6).

If it is decided that the number of the screen saver images selectively inputted is not plural but singular, the image data stored in the first field memory 410 and the image data stored in the second field memory 420 are read out, and the corresponding images are alternately reproduced for an optional period (e.g. 10 sec), respectively (S7). On the other hand, if it is decided that two or more screen saver images have been selectively inputted, the image data stored in the first field memory 410 are successively read out and the corresponding images are reproduced (S8). In this way, the program of starting the screen saver is completed.

In accordance with the image reproducing apparatus A configured as described above, while the user enjoys the reproduced image from the DVD 600 displayed on the display device B, whenever he presses the input unit 310, the reproduced image is saved as a screen saver image. Thereafter, when the condition of starting the screen saver prescribed by the used is satisfied, the screen saver image thus saved is displayed on the display device B. Concretely, if a single screen saver image is selectively inputted as a result that the input unit 310 has been pressed once, this screen saver image and the opening screen image are alternately displayed. On the other hand, if plural screen saver images are selectively inputted as a result that the input unit 31 has been pressed twice or more, the plural screen saver images are successively displayed.

In this way, since the user's favorite image can be freely selected from the reproduced images of the DVD 600 and saved as a screen saver image, the range of amusement of the image reproducing apparatus A is extended and its product value is enhanced.

The screen saver control unit 111 of the image reproducing apparatus can be modified in design as follows. In starting the screen saver, the image data stored in the first field memory 410 may be read out to reproduce their images as screen saver images. In this case, unlike the above embodiment, the opening image is not displayed, but the plural screen saver images recorded in the first field memory 410 are successively reproduced. In this case, since the second field memory 420 is done without, this embodiment can be realized in lower cost than the previous embodiment described above.

Further, the following design modification permits the user's favorite image to be freely selected from the reproduced images from the DVD 600 and saved as a screen saver image without using the memory including the first field memory 410 and the second field memory 420. In this case, the image reproducing apparatus includes a memory for storing the data of the track of a storage medium corresponding to the reproduced image, an input unit for selectively inputting a screen saver image from the reproduced images, and a screen saver control unit which stores, in the memory, the data of the track of the storage medium corresponding to the image data of the pertinent image when the screen saver image is selectively selected through the input unit, reads out the data stored in the memory in starting the screen saver, and reproduces the image data stored in the track corresponding to the pertinent data from the storage medium. In this case, the memory can be realized with a much smaller capacity than that of the first field memory 410 and the second field memory 420. For this reason, this modification can be realized at lower cost that the previous embodiments described above.

Additionally, the image reproducing apparatus according to this invention may be used as an image reproducing apparatus for not only DVD but also video tape, CD-ROM, CD-R, CD-RW, etc. Further, the image reproducing apparatus according to this invention can be applicable to a television receiver for digital broadcasting, satellite broadcasting, etc. which reproduce the image on the image data in a video signal. Incidentally, the function of the screen saver control unit may be realized in hardware without using a microcomputer.

As described above, in accordance with the image reproducing apparatus described in aspect 1, in an image reproducing apparatus which has a function of a screen saver and reproduce an image on the basis of the image data read out from a storage medium or the image data contained in a video signal, the image reproducing apparatus includes: a first field memory capable of storing image data corresponding to a plurality of images; a second field memory which previously stores an image data of an opening image; an input unit for selectively inputting a screen saver image from reproduced images; and a screen saver control unit which stores the image data of the pertinent image in the first field memory whenever the screen saver image is selectively inputted through the input unit, and said screen saver control unit is configured so that where a single screen saver image is selectively inputted through the input unit, in starting the screen saver, the image data stored in the first field memory and stored in the second field memory are reproduced and images of both image data are alternately reproduced; and on the other hand, where two or more screen saver images are selectively inputted through the input unit, in starting the screen saver, the respective image data stored in the first field memory are successively read out and reproduced.

Therefore, in the case of the image reproducing apparatus described in aspect 1, since the user's favorite image can be freely selected from the reproduced images as a screen saver image, the range of amusement of the image reproducing apparatus is extended and its product value is enhanced.

In accordance with the image reproducing apparatus described in aspect 2, in an image reproducing apparatus which has a function of a screen saver and reproduce an image on the basis of the image data read out from a storage medium or the image data contained in a video signal, the image reproducing apparatus includes: a first field memory capable of storing image data of reproduced images; an input unit for selectively inputting a screen saver image from reproduced images; and a screen saver control unit which stores the image data of the pertinent image in the first field memory when the screen saver image is selectively inputted through the input unit, and in starting the screen saver, read out the image data stored in the first field memory to reproduce their images as screen saver images.

The image reproducing apparatus described in aspect 2 has the same merit as that described in aspect 1. This apparatus can do without the second field memory, and hence can be realized in lower cost than the apparatus described in aspect 1.

In accordance with the invention described in aspect 3, in an image reproducing apparatus which has a function of a screen saver and reproduces an image on the basis of the image data read out from a storage medium or the image data contained in a video signal, the image reproducing apparatus includes: a memory for storing the data of the track of a storage medium corresponding to a reproduced image, an input unit for selectively inputting a screen saver image from reproduced images, and a screen saver control unit which stores, in the memory, the data of the track of the storage medium corresponding to the image data of the pertinent image when the screen saver image is selectively selected through the input unit, reads out the data stored in the memory in starting the screen saver, and reproduces the image data stored in the track corresponding to the pertinent data from the storage medium.

Therefore, in the case of the image reproducing apparatus described in aspect 3, since the user's favorite image can be freely selected from the reproduced images as a screen saver image, the range of amusement of the image reproducing apparatus is extended and its product value is enhanced. In addition, since no field memory is required, cost reduction can be made as compared with the cases in aspect 1 or 2.

What is claimed is:

1. An image reproducing apparatus which has a function of a screen saver and reproduces an image on the basis of the image data read out from a storage medium or the image data contained in a video signal, said image reproducing apparatus comprising:

a first field memory capable of storing image data corresponding to a plurality of images;

a second field memory which previously stores an image data of an opening image;

an input unit for selectively inputting a screen saver image from reproduced images; and a screen saver control unit which stores the image data of the pertinent image in said first field memory whenever the screen saver image is selectively inputted through the input unit, wherein said screen saver control unit is configured so that where a single screen saver image is selectively inputted through said input unit, in starting said screen saver, the image data stored in said first field memory and stored in said second field memory are reproduced and images of both image data are alternately reproduced; and where two or more screen saver images are selectively inputted through said input unit, in starting said screen saver, the respective image data stored in said first field memory are successively read out and reproduced.

2. An image reproducing apparatus which has a function of a screen saver and reproduces an image on the basis of the image data read out from a storage medium or the image data contained in a video signal, said image reproducing apparatus comprising:

a first field memory capable of storing image data of reproduced images; and an input unit for selectively inputting a screen saver image from reproduced images; and a screen saver control unit which stores the image data of the pertinent image in said first field memory when the screen saver image is selectively inputted through said input unit, and in starting said screen saver, read out the image data stored in said first field memory to reproduce the images as screen saver images, where two or more screen saver images are selectively inputted through said input unit, in starting said screen saver, the respective image data stored in said first field memory are successively read out and reproduced.

3. An image reproducing apparatus which has a function of a screen saver and reproduces an image on the basis of the image data read out from a storage medium or the image data contained in a video signal, said image reproducing apparatus comprising:

a memory for storing the data of the track of a storage medium corresponding to a reproduced image, an input unit for selectively inputting a screen saver image from reproduced images, and a screen saver control unit which stores, in said memory, the data of the track of the storage medium corresponding to the image data of the pertinent image when the screen saver image is selectively inputted through said input unit, reads out the data stored in said memory in starting said screen saver, and reproduces the image data stored in the track corresponding to the pertinent data from the storage medium, where two or more screen saver images are selectively inputted through said input unit, in starting said screen saver, the respective image data stored in said memory are successively read out and reproduced.

* * * * *